United States Patent [19]

Taylor

[11] Patent Number: 4,535,876
[45] Date of Patent: Aug. 20, 1985

[54] SHOCK ABSORBER CONSTRUCTION

[75] Inventor: Paul H. Taylor, Grand Island, N.Y.

[73] Assignee: Tayco Developments, Inc., North Tonawanda, N.Y.

[21] Appl. No.: 475,914

[22] Filed: Mar. 16, 1983

[51] Int. Cl.³ .......................... F16F 9/18; F16D 51/00
[52] U.S. Cl. .................. 188/311; 137/269.5; 188/322.14
[58] Field of Search ............ 188/311, 312, 322.11, 188/322.12, 322.14, 322.17, 322.21, 322.19, 270, 275, 279; 137/269.5; D23/19, 22; 267/64.28; 16/66, 84

[56] References Cited

U.S. PATENT DOCUMENTS

| | | | |
|---|---|---|---|
| 1,931,178 | 10/1933 | Carlson | 16/84 |
| 2,013,920 | 9/1935 | Kulick | 188/311 |
| 2,074,008 | 3/1937 | Wolf | 16/84 |
| 2,922,432 | 1/1960 | Huntington et al. | 137/269.5 |
| 3,095,006 | 6/1963 | Smith | 137/269.5 |
| 4,257,443 | 3/1981 | Turney | 137/269.5 |
| 4,265,344 | 5/1981 | Taylor | 188/322.17 |

FOREIGN PATENT DOCUMENTS 1430051 10/1968 Fed. Rep. of Germany ................... 188/322.14

Primary Examiner—Bruce H. Stoner, Jr.
Assistant Examiner—Robert J. Oberleitner
Attorney, Agent, or Firm—Joseph P. Gastel

[57] ABSTRACT

A shock absorber which can be used in tension or compression and which is adjustable in either mode of operation including a casing having first and second ends, a piston rod extending through the first end and having a piston head mounted thereon within the casing, a reversible check valve structure mounted in a cartridge for insertion into the second end, a spring within the cartridge, an adjustable member for exerting a force on one end of the spring, and a check valve member biased by the opposite end of the spring.

8 Claims, 10 Drawing Figures

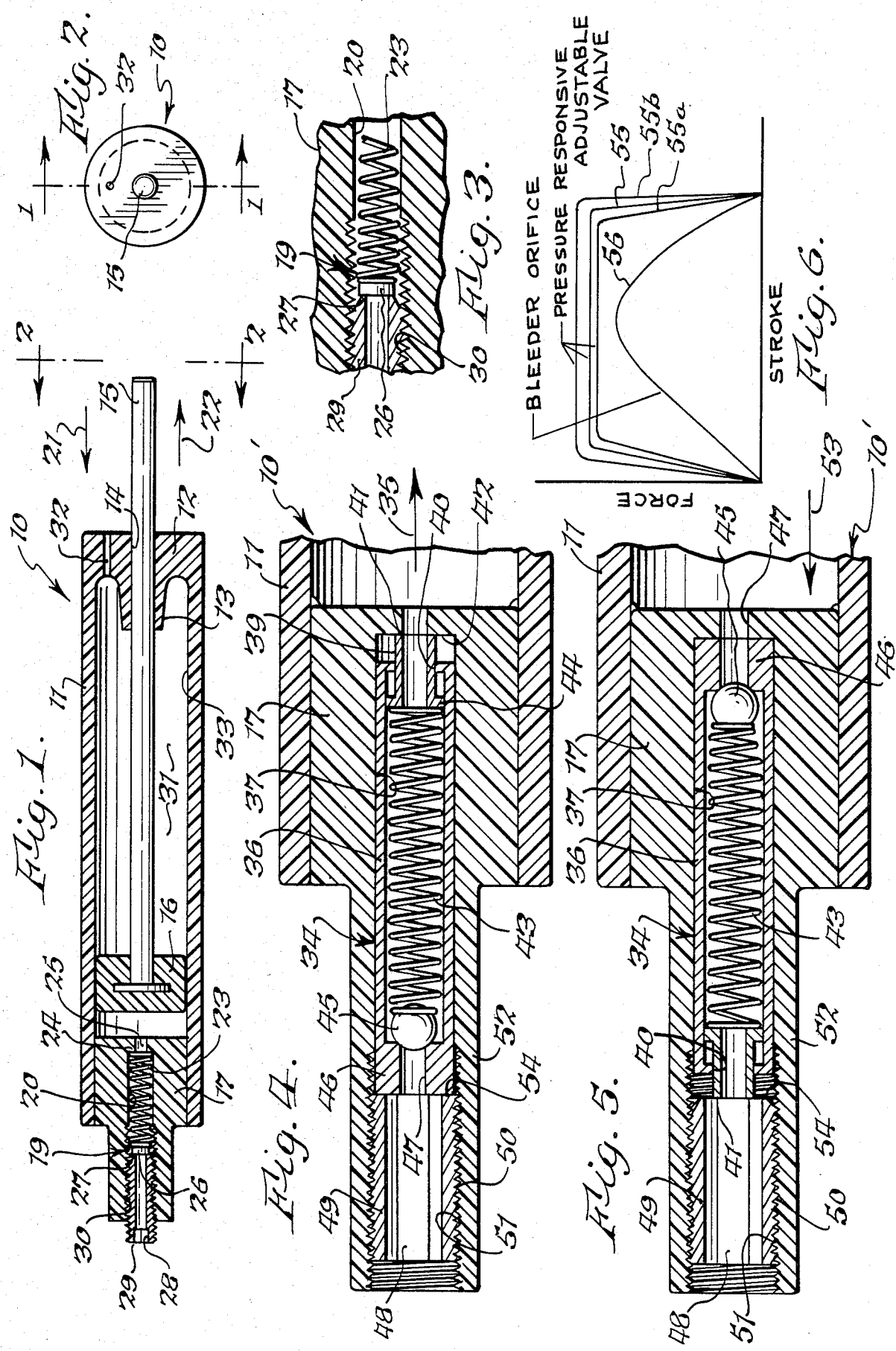

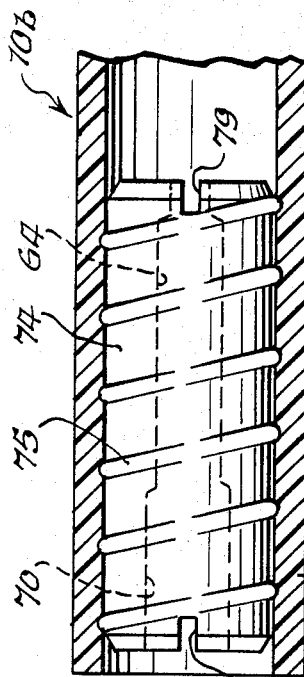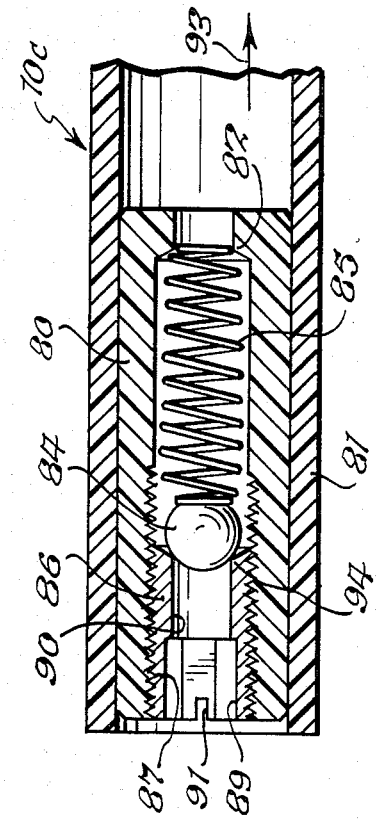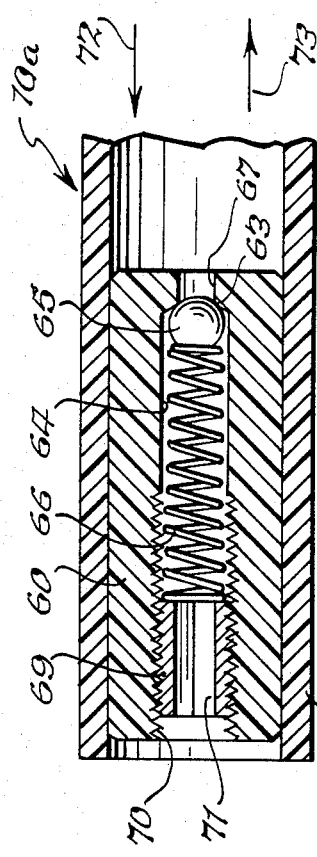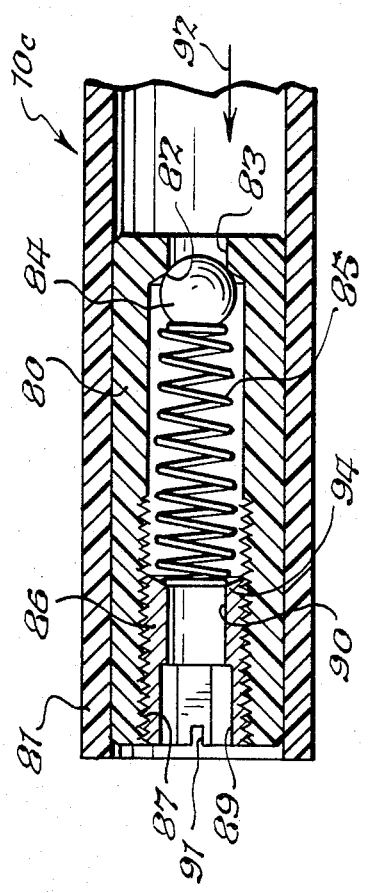

4,535,876

SHOCK ABSORBER CONSTRUCTION

BACKGROUND OF THE INVENTION

The present invention relates to an improved shock absorber which includes structure which permits it to be selectively built for use either in tension or compression and which is adjustable in either mode.

SUMMARY OF THE INVENTION

It is one object of the present invention to provide an improved shock absorber which can be set up to operate either in tension or compression. A related object of the present invention is to provide an improved shock absorber in which the conversion between operation in tension or compression can be done simply by merely reversing certain parts thereof. A further related object of the present invention is to provide an improved shock absorber in which the resisting force of the shock absorber can be adjusted in either mode of operation in an extremely simple manner. Other objects and attendant advantages of the present invention will readily be perceived hereafter.

The present invention relates to a shock absorber comprising a casing having first and second ends, a chamber in said casing for containing fluid, a piston head in said chamber, a piston rod mounting said piston head and extending through said first end, means at said first end of said casing for supporting said piston rod for sliding movement, bleed means in said casing for providing said fluid to said chamber from an area external of said casing, and reversible check valve means mountable in first and second positions on said casing for causing said shock absorber to provide shock absorption in a first direction of piston movement when said check valve means is in said first position and for causing said shock absorber to provide shock absorption in a second direction which is opposite to said first direction when said check valve means is in said second position.

The various aspects of the present invention will be more fully understood when the following portions of the specification are read in conjunction with the accompanying drawings wherein:

BRIEF DESCRIPTION OF THE DRAWINGS

FIG. 1 is a cross sectional view taken substantially along line 1—1 of FIG. 2 and showing one embodiment of the improved shock absorber in cross section;

FIG. 2 is an end elevational view taken substantially in the direction of arrows 2—2 of FIG. 1;

FIG. 3 is a fragmentary enlargement of the valve area of FIG. 1;

FIG. 4 is an enlarged fragmentary cross sectional view of another embodiment showing particularly the end of the shock absorber which mounts a reversible adjustable cartridge for causing the shock absorber to operate adjustably in tension;

FIG. 5 is a view similar to FIG. 4 but showing the cartridge reversed so as to cause the shock absorber to be operable in compression;

FIG. 6 is a force diagram showing the force on the pressure responsive valve and at the bleeder orifice at various positions of the stroke;

FIG. 7 is a fragmentary cross sectional view of another embodiment of the present invention;

FIG. 8 is a fragmentary view, partly in cross section and partly in side elevation of a further embodiment of the present invention;

FIG. 9 is a fragmentary cross sectional view of yet another embodiment of the present invention and showing the adjustable pressure responsive valve structure in a position when the shock absorber functions in compression; and FIG. 10 is a view similar to FIG. 9 but showing the adjustable pressure responsive valve structure in the position which it occupies when the shock absorber functions in tension.

DESCRIPTION OF THE PREFERRED EMBODIMENTS

The improved shock absorber 10 of FIGS. 1-3 includes a molded plastic casing 11 having an integral molded end wall 12 having an integrally formed seal 13 surrounding bore 14 which slidingly receives piston rod 15 in sealing engagement. The seal structure is shown in U.S. Pat. No. 4,265,344, which is incorporated herein by reference but which forms no part of the present invention. A piston head 16 is suitably secured to the end of piston rod 15. An end wall 17 is suitably secured at the end of casing 11 opposite to end wall 12, and a reversible pressure controlling structure 19 is located in a bore 20 in end wall 17 so as to permit the shock absorber to be set up to operate in compression or tension, the compression being when piston rod 15 moves in the direction of arrow 21 and tension being when piston rod 15 moves in the direction of arrow 22. As set up in FIG. 1, the shock absorber check valve structure is in position to operate in tension, that is, when piston rod 15 moves in the direction of arrow 22 when subjected to shock loads.

The check valve structure 19 is located in bore 20 and includes a spring 23 having one end bearing against shoulder 24 which is located proximate bore 25. The other end of spring 23 bears against check valve member 26 which presses against annular seat 27 at the end of hollow threaded sleeve 29 which is threadably received in tapped bore 30. Sleeve 29 has a hexagonal bore 28 in the end thereof for receiving an Allen wrench. By adjusting the axial position of sleeve 29 within bore 30 by use of the Allen wrench, the force which spring 23 exerts on check valve member 26 can be varied to thereby vary the resisting force which the shock absorber will provide when piston rod 15 is moved in the direction of arrow 22. Any air in chamber 31 to the right of piston 16 will be expelled through orifice 32 in end wall 12. It will be appreciated that there is a slight clearance between the outer periphery of piston head 16 and the inner surface 33 of casing 11 so that the pressure on opposite sides of piston head 16 will tend to equalize, as this action is necessary when the shock absorber operates in compression.

If it is desired to cause the shock absorber 10 to operate in compression, that is, to provide the shock absorption when piston rod 15 is subjected to forces in the direction of arrow 21, it is merely necessary to unscrew sleeve 29, remove check valve member 26 and spring 19, reinsert the check valve member 26 so that it bears against shoulder 24 and covers orifice 25, reinsert spring 23, and thereafter screw in sleeve 29 until the proper spring force on check valve member 26 is obtained. While the shock absorber is primarily intended to be pneumatic, it will be appreciated that it can be immersed in a liquid to operate in the same manner as in air. The shock absorber is therefore being considered to be of the fluid type.

A modified shock absorber 10' is shown in FIGS. 4 and 5. This modified form differs from the embodiment of FIGS. 1, 2 and 3 only in that a check valve cartridge is used rather than the separate spring and check valve of FIGS. 1, 2 and 3.

The shock absorber 10' of FIG. 4 has cartridge 34 oriented therein so that it will operate in tension, that is, when the piston rod is moved in the direction of arrow 35. The cartridge 34 includes a housing 36 which is preferably fabricated of molded plastic, and which is received in bore 37 of end wall 17. An annular presser member 39 has a central portion which is slidably received in orifice 40 in the end wall of cartridge 36. The end 41 of presser member 39 abuts shoulder 42 of the end wall 17. One end of spring 43 bears against the end 44 of the presser member and the other end of spring 43 biases ball check valve 45 against a seat on cartridge end wall 46 so as to obstruct bore 47. An annular retaining and adjusting sleeve 49 bears against housing end wall 46 and sleeve 49 has threads 50 on the outside thereof which are received in threaded relationship in tapped portion 51 in neck 52 extending outwardly from end wall 17. It will readily be appreciated that the force which spring 43 exerts on ball check valve 45 is determined by the position of sleeve 49 inasmuch as this will determine the amount that presser member 39 compresses spring 43.

If it is desired to cause shock absorber 10' to operate in compression, that is, to absorb shocks when the piston rod 15 is moved in the direction of arrow 53, it is merely necessary to reverse the position of cartridge 34 to the position shown in FIG. 4. This can be achieved by unscrewing sleeve 49, removing cartridge 34, turning cartridge 34 end-for-end, reinserting cartridge 34 into bore 37, and reinserting sleeve 49 until the desired force is obtained on spring 43. In the reversed position the end portion 54 of retaining sleeve 49 will bear against the end 41 of presser member 39 so as to provide the capability of adjusting the compression of spring 43, to thereby adjust the resistive strength of the shock absorber. Retaining sleeve 49 has a hexagonal bore 48 therein to receive an Allen wrench for removing and replacing sleeve 49.

In FIG. 6 graphs 55, 55a and 55b depict 90% efficient force-stroke diagrams for various valve settings. Each graph shows the constant force from the pressure responsive valve at various positions of the pressure responsive valve pressuring screw for air velocity. Graph 56 shows the force at various portions of the stroke for a simple needle valve bleeder orifice of conventional design at one velocity with an efficiency of only 60%.

In FIG. 7 a further embodiment of the present invention is disclosed. The shock absorber 10a is constructed identically to that disclosed in FIG. 1 except for the structure at the left end. In the embodiment of FIG. 7 a combined end wall and cartridge 60 is press-fitted into the end 61 of cylinder 62. A seat 63 is provided at the end of bore 64 for seating ball check valve 65 which is biased by spring 66 to overlie bore 67. A sleeve 69 is threadably received within tapped bore 70 to adjust the compressive force on spring 66. A hexagonal bore 71 within sleeve 69 receives an Allen wrench for adjustment purposes.

As the check valve is set up in FIG. 7, the shock absorber will operate in compression, that is, when the piston moves in the direction of arrow 72. If it is desired to have the shock absorber operate in tension, sleeve 69 may be removed from bore 70 to permit the threadable insertion of a puller member (not shown) into tapped bore 70. The puller member is used to remove combined end wall and cartridge 60 from cylinder 62, which is thereafter reinserted into end 61 with a press fit after sleeve 69 has been adjusted to provide the proper force on ball check valve 65. After combined end wall and cartridge 60 has thus been reversed, the shock absorber 10a will operate in tension, that is to provide shock absorption, when a force in the direction of arrow 73 is applied to the piston.

In FIG. 8 a modification of the embodiment of FIG. 7 is disclosed. The shock absorber 10b includes a combined end wall and cartridge 74 which includes an internal construction which is identical to cartridge 60 of FIG. 7. However, the outside of plastic cartridge 74 has a helical thread 75 molded thereon. Cartridge 74 may be inserted into end 61 of cylinder 62 by either pressing it in the direction of arrow 76, or by screwing it into position by applying a screwdriver to screwdriver receiving slot 77. If it is desired to reverse the position of cartridge 74, it is merely necessary to unscrew it by applying a screwdriver to screwdriver slot 77 and thereafter reinsert cartridge 74 in position by applying a screwdriver to screwdriver slot 79. In the embodiment of FIG. 8 it is not necessary to change the position of sleeve 69 in order to remove cartridge 74.

In FIGS. 9 and 10 a further embodiment of the present invention is disclosed. The shock absorber 10c is identical to that shown in FIG. 1 except for the structure at the end 81 of the cylinder. End wall 80 is press-fitted into the end 81 of the cylinder and need not be removed for either varying the operating force of the check valve or for reversing the check valve operation for permitting the shock absorber 10c to operate either in tension or compression.

End wall 80 includes a seat 82 proximate bore 83. A ball check valve 84 is biased onto seat 82 by one end of spring 85, the other end of which bears against sleeve 86 which is threadably received in tapped bore 87 of end wall 80. Sleeve 86 has a bore 90 therein in line with hexagonal socket 89. A screwdriver slot 91 is provided in the end of sleeve 86 for receiving a screwdriver for turning sleeve 86 to adjust the force on spring 85. Screwdriver slot 91 consists of two diametrically aligned slots spaced 180° from each other on sleeve 86.

In FIG. 9 the check valve structure of shock absorber 10c is set up to cause it to operate in compression, that is, when the piston moves in the direction of arrow 92. However, if it is desired to cause the shock absorber to operate in tension, that is, when the piston moves in the direction of arrow 93, it is not necessary to remove end wall 80, as in the embodiments of FIGS. 7 and 8. All that is required is to unscrew sleeve 86 by applying a screwdriver to slot 91, remove spring 85 and check valve 84, reinsert the spring 85 so that one end bears against seat 82, reinsert check valve 84, and thereafter thread sleeve 86 into position so that the ball check valve 84 will bear against seat 94 on sleeve 86. The axial position of sleeve 86 will determine the force of spring 85 on ball 84. The embodiment of FIGS. 9 and 10 is basically similar to the embodiments of FIGS. 1-3 except that the end wall 80 is press-fitted in position and utilizes a ball check valve.

It can thus be seen that the improved shock absorber device of the present invention is manifestly capable of achieving the above enumerated objects, and while preferred embodiments of the present invention have been disclosed, it will be appreciated that it is not limited thereto but may be otherwise embodied within the scope of the following claims.

What is claimed is:

1. A shock absorber comprising a casing having first and second ends, a chamber in said casing for containing fluid, a piston head in said chamber, a piston rod mounting said piston head and extending through said first end, means at said first end of said casing for supporting said piston rod for sliding movement, bleed means in said casing for providing said fluid to said chamber from an area external of said casing, reversible check valve means mountable in first and second positions on said casing for causing said shock absorber to provide shock absorption in a first direction of piston movement when said check valve means is in said first position and for causing said shock absorber to provide shock absorption in a second direction which is opposite to said first direction when said check valve means is in said second position, said check valve means comprising a cartridge, said cartridge comprising an elongated housing having first and second housing ends, a housing orifice in said first end, a check valve member, an elongated spring extending between said check valve member and said second housing end for biasing said check valve member toward said housing orifice in said first housing end, means at said second end of said casing for mounting said cartridge, an end wall at said second end of said casing, a bore in said end wall, an opening in said second housing end, spring pressing means mounted in said opening in said second housing end for bearing on the end of said spring remote from said check valve member, retaining means for retaining said cartridge in said bore in said second end wall, said spring pressing means comprising a presser member extending through said opening in said second housing end, a first end on said presser member for engaging said spring, and a second end on said presser member for receiving a force for effecting movement of said presser member into said cartridge for compressing said spring.

2. A shock absorber as set forth in claim 1 wherein said bore in said second end wall of said casing includes a shoulder at the end thereof proximate said chamber, and wherein said second end of said presser member engages said shoulder, and wherein said retaining means engages said first housing end when said shock absorption is in said first direction.

3. A shock absorber as set forth in claim 2 wherein said retaining means is adjustably mounted in said second end wall for varying the compression of said spring.

4. A shock absorber as set forth in claim 3 wherein said bore includes a shoulder at the end thereof proximate said chamber, and wherein said first housing end engages said shoulder, and wherein said retaining means engages said second end of said presser member when said shock absorption is in said second direction.

5. A shock absorber as set forth in claim 4 wherein said retaining means is adjustably mounted in said second end wall for varying the compression of said spring.

6. A shock absorber as set forth in claim 4 wherein said second end of said presser member engages said shoulder, and wherein said retaining means engages said first housing end when said shock absorption is in said first direction.

7. A shock absorber as set forth in claim 6 wherein said retaining means is adjustably mounted in said second end wall for varying the compression of said spring.

8. A shock absorber as set forth in claim 6 wherein said retaining means comprises an elongated sleeve, threads on the outside of said sleeve, and a tapped bore in said second end wall for receiving said elongated sleeve in threaded relationship.

* * * * *